United States Patent [19]

Kyriakis

[11] Patent Number: 5,532,588
[45] Date of Patent: Jul. 2, 1996

[54] CABLE ECCENTRICITY GAUGE INCLUDING AN E-SHAPED CORE AND A SENSOR COIL DISPOSED BETWEEN AN OUTER TIP OF THE CENTRAL LIMB AND THE CABLE

[75] Inventor: John Kyriakis, London, England

[73] Assignee: Beta Instrument Co., Ltd., Bucks, England

[21] Appl. No.: 278,227

[22] Filed: Jul. 21, 1994

Related U.S. Application Data

[63] Continuation-in-part of Ser. No. 202,659, Feb. 28, 1994.

[30] Foreign Application Priority Data

Feb. 26, 1993 [GB] United Kingdom ............ 9303978

[51] Int. Cl.$^6$ ........................ G01N 27/72; G01N 21/84
[52] U.S. Cl. ........................................ 324/226; 356/72
[58] Field of Search ........................ 324/228–231, 324/226, 207.15, 207.16, 234, 236, 239, 241, 243; 356/72

[56] References Cited

U.S. PATENT DOCUMENTS

| | | |
|---|---|---|
| 4,086,044 | 4/1978 | Sikora . |
| 4,117,401 | 9/1978 | Glavert .................. 324/207.15 |
| 4,132,980 | 1/1979 | Zabler .................... 324/207.16 |
| 4,641,525 | 2/1987 | Merki . |
| 4,931,732 | 6/1990 | Moon ........................... 324/228 |
| 4,964,301 | 10/1990 | Lysen ..................... 324/207.17 |
| 5,075,622 | 12/1991 | Konii et al. ................. 324/229 |
| 5,214,376 | 5/1993 | Sikora . |
| 5,394,085 | 2/1995 | Nix et al. ..................... 324/231 |

FOREIGN PATENT DOCUMENTS

0457316A1  11/1991  European Pat. Off. .

Primary Examiner—Sandra L. O'Shea
Assistant Examiner—Roger Phillips
Attorney, Agent, or Firm—Griffin, Butler, Whisenhunt & Kurtossy

[57] ABSTRACT

The invention relates to method and apparatus for measuring and displaying the eccentricity or off-set position with respect to coaxiality of a metallic conductor within an insulating coating during an extrusion process. The measuring apparatus employs a combination of optical and electrically inductive techniques to determine respectively the position of the outer coating of the cable and that of the core within the cable. By relating these positional measurements it is possible to determine the position of the core relative to a desired location namely the coaxial position so that appropriate corrections can be made to the extrusion process to keep the core in that coaxial position.

12 Claims, 5 Drawing Sheets

CABLE ECCENTRICITY GAUGE INCLUDING AN E-SHAPED CORE AND A SENSOR COIL DISPOSED BETWEEN AN OUTER TIP OF THE CENTRAL LIMB AND THE CABLE

This application is a continuation-in-part application of application Ser. No. 08/202,659, filed Feb. 28, 1994.

FIELD OF THE INVENTION

The present invention relates to the formation of an electrical cable by extrusion techniques and particularly to a method and apparatus for monitoring the position of the conductor core of the cable in relation to the outer extruded coating in order that the extrusion process can be controlled to maintain the core on the central axis of the cable.

BACKGROUND OF THE INVENTION

During the manufacture of an electrical cable by means of continuous extrusion, an inner conductor wire such as of copper, aluminium, steel or other electrically conductive material is coated with an insulating material of plastics, rubber and the like, the coating being applied as by extrusion from an extruder through which the inner conductor is passed at a predetermined speed.

The finished product coming from the extruder then undergoes a cooling process which cools the hot plastics or rubber coating issuing from the hot extruder whereafter the product is wound onto a drum or reel.

To preserve the electrical and mechanical characteristics of the cable, it is important that the inner conductor is located along the central axis of the cable.

SUMMARY OF THE INVENTION

It is accordingly an object of the present invention to provide a method and apparatus for determining the position of the conductor core of an electrical cable during an extrusion process so as to ensure that it is maintained in a central cable axial position during the process.

According to one aspect of the present invention, there is provided apparatus for determining the position of the conductor core of an electrical cable being formed in an extrusion process comprising optical means for transmitting a beam of light towards the cable, detector means for receiving either the beam reflected from the cable or that portion of the beam not obscured by the cable in transmission and providing output signals representative of the position of the outer surface of the cable in relation to the optical means, electrical inductive means for inducing magnetic fields in the vicinity of the cable, means for detecting variation in the field strength of said :magnetic fields as a result of movement of the conductor core through said fields corresponding to a change in position of the conductor core from a desired location within the cable thereby to provide a measure of the position of the conductor core in relation to the inductive means, and means for relating the position of said conductor core to the position of the outer surface of the cable whereby to determine the eccentricity or off-set position of the conductor core with respect to said desired location within the cable.

According to another aspect of the present invention there is also provided a method for determining the position of the conductor of an electrical cable being formed in an extrusion process comprising transmitting a beam of light towards the cable, providing output signals representative of the position of the outer surface of the cable and corresponding either to the reflection of the beam from the cable or that portion of the transmitted beam not obscured by the cable in transmission, providing induced magnetic fields in the vicinity of the cable, determining the variation in said magnetic fields brought about by a change in position of the conductor core moving from a desired location within the cable through the induced magnetic fields to provide a measure of the position of the conductor core, and determining the position of the conductor core with respect to the desired location by relating the position of the outer surface of the cable to the position of the conductor core.

BRIEF DESCRIPTION OF THE DRAWINGS

The invention will now be described in preferred detail with reference to the accompanying drawings wherein.

PREFERRED EMBODIMENTS OF THE INVENTION

Figure 1:
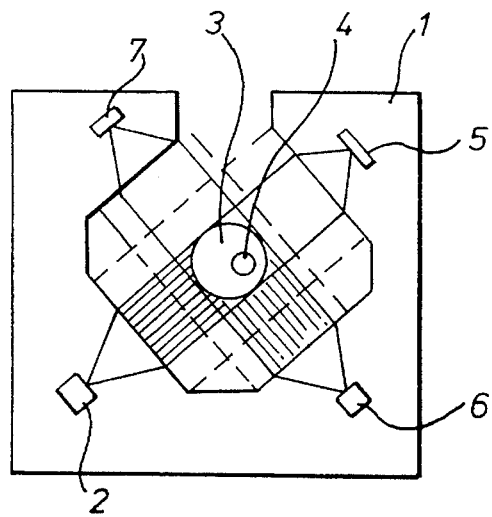
FIG. 1 depicts a measuring system in end view in accordance with a first embodiment of the invention.

The measuring system 1 shown in FIG. 1 is designed to determine the eccentricity or off-centre axial position of the core of a moving electrical cable in an extrusion process using optical and electrical measuring techniques.

It comprises a first light source 2 for emitting a beam of light directed at a moving cable 3 provided with a conductor core 4.

A photosensitive detector 5 is positioned in the path of the beam from the light source 2 such that the detector 5 receives that portion of the light beam from light source 2 which is not obscured by the cable 3.

A second light source 6 transmits a beam of light across the cable 3, the beam of light from the fight source 6 having an axis at 90° to the axis of the light beam from the other light source 2.

A photosensitive device 7 is positioned on the axis of the light beam from the light source 6, and this photosensitive device 7 receives that portion of the light beam from the light source 6 which is not obscured by the cable 3.

The outputs from the photosensitive devices 5 and 7 may be used to determine the diameter or width of the cable 3 and thus the position of the outer surface of the cable at the respective ends of that diameter or width.

The measuring system 1 also incorporates a pair of induction coils 8 and 9 disposed on either side of cable 3, and on the same axis as that of the parallel scanning beam emitted by light source 2 and received by the photosensitive detector 5.

Further induction coils 10 and 11 may be positioned on either side of the cable 3 and on the axis corresponding to the axis of the parallel scanning beam emitted by light source 6 and detected by photosensitive detector 7.

Magnetic fields induced during passage of current, preferably ac current, through the induction coils 8, 9, 10 and 11 are used to determine the position of the inner core 4 of the cable 3.

Thus, for example, a current $I_1$ passed through coil 8 and a current $I_2$ passed through coil 9 will set up magnetic fields 12 and 13 respectively in opposition to one another and depending on the direction of the current passing through the coils $I_1$ and $I_2$.

The system is designed such that when the conductor 4 is midway between the coils 8 and 9, the current $I_1$ and $I_2$ are equal.

If the conductor core 4 moves away from its position and along the axis between the coils 8 and 9, i.e., along the optical axis between the light source 2 and the detector 5, currents $I_1$ and $I_2$ will change relative to one another.

By measuring this difference it is possible to deduce a change of position of the conductor 4 along the axis of the light beam emitted by light source 2.

A similar movement along the axis of the optical beam emitted by light source 6 can be determined by means of induction coils 10 and 11.

Figure 2:
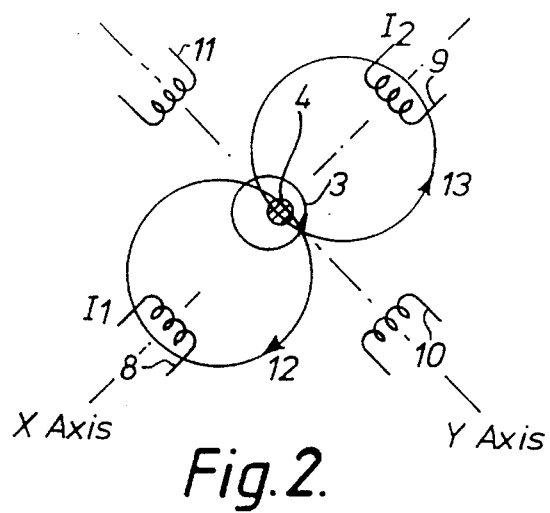
FIG. 2 illustrates how induction coils of the measuring system of FIG. 1 are positioned around the travelling electrical cable.
Figure 3:
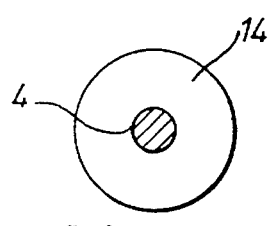
FIGS. 3A and 4 illustrate how the eccentricity of the conductor core of the travelling electrical cable may be calculated using the measuring system of the invention in relation to a central position.
Figure 4:
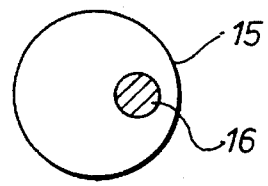
Figure 4:
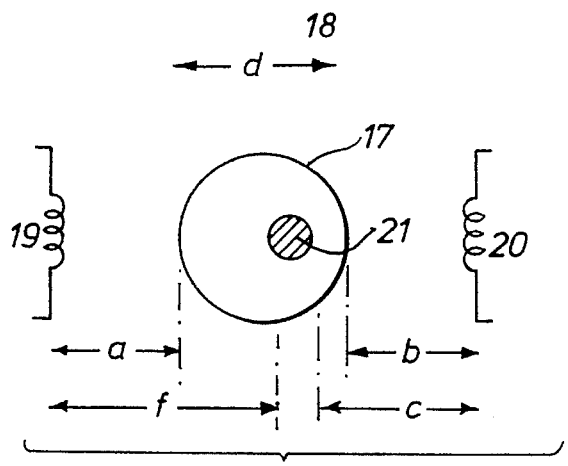

FIGS. 3, 3A and 4 illustrate the way in which the determination of the position of the outer cable by the optical system of FIG. 1 and the determination of the position of the conductor core 4 of the cable 3 by means of the system shown in FIG. 2, is utilised to measure the eccentricity of the cable core 4.

Thus, as illustrated in FIG. 3, the desired correct position of the conductor core 4 is along the central axis of the cable 14 therein depicted.

The eccentricity of the cable is defined by any position off this central axis as shown in FIG. 3, namely to the position 16 in relation to the outer surface of the cable 15.

With reference to FIG. 4, consider an electrical cable 17 moving in an extrusion process and wherein the inner conductor 21 has moved off-centre.

The position of the outer surface of the electrical cable 17 is determined optically by an optical measurement of distances 'a' and 'b', that is between the induction coil 19 on one side of the cable and induction coil 20 on the other side of the cable and lying on the optical axis of the transmitted light beam, for example, light source 2 shown in FIG. 1.

The position of the inner core 21 of the electrical cable is measured by induction coils 19 and 20 as explained with reference to FIG. 2 and these are differences 'f' and 'c' as shown. Eccentricity e of the inner core 21 is defined by the equation $$e = \frac{f-a}{c-b}$$

Figure 5:
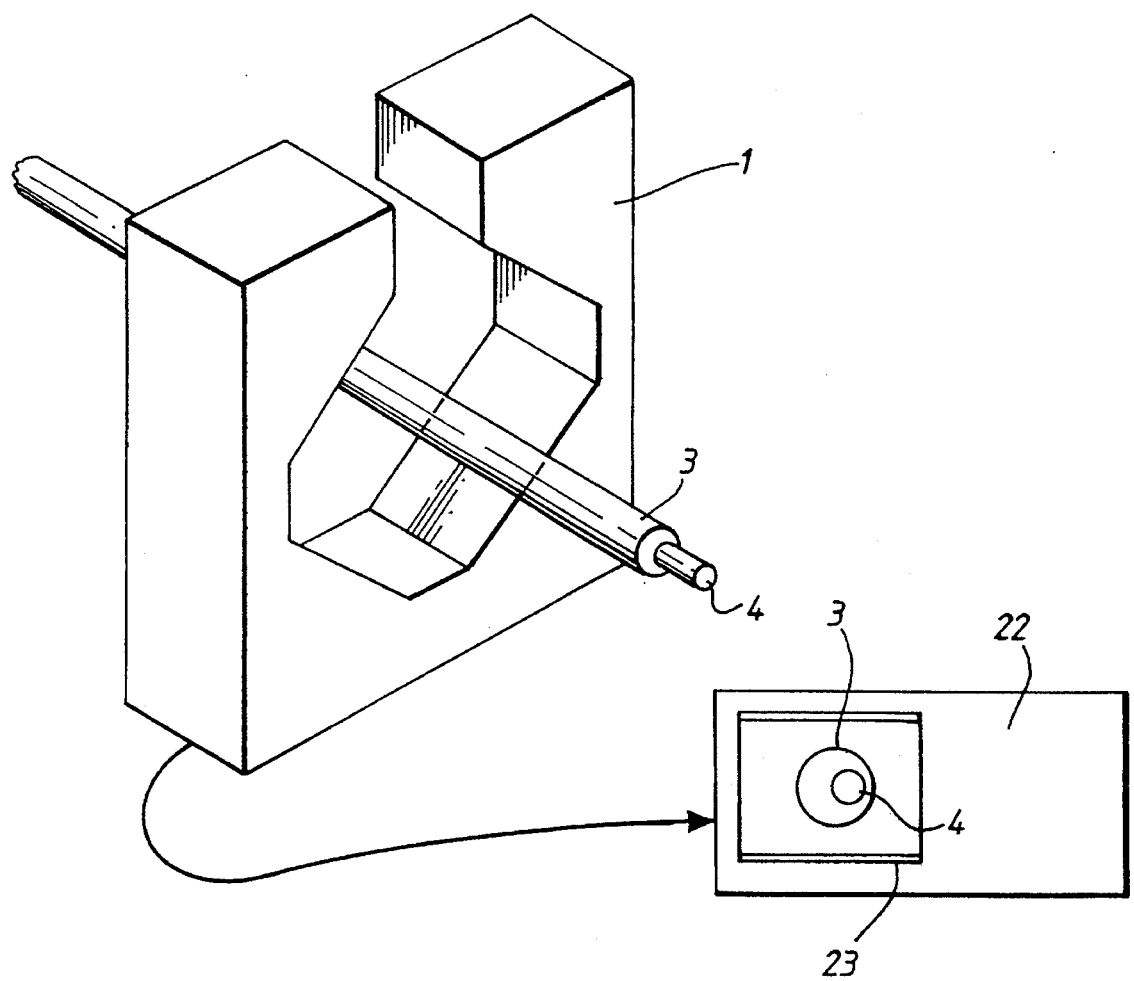
FIG. 5 is a perspective view of generalised illustration of the measuring system as shown in FIG. 1.

The optical and electrical measuring system 1 as described with reference to FIGS. 1 and 2 is shown in perspective view in FIG. 5.

The measurements of the eccentricity of the conductor core 4 of the cable 3 are performed on a continuous basis and processed in an indicator unit 22 provided with a cathode ray tube 23 which is set to display a cross sectional view of the cable 3 with conductor core 4 as shown.

Figure 6:
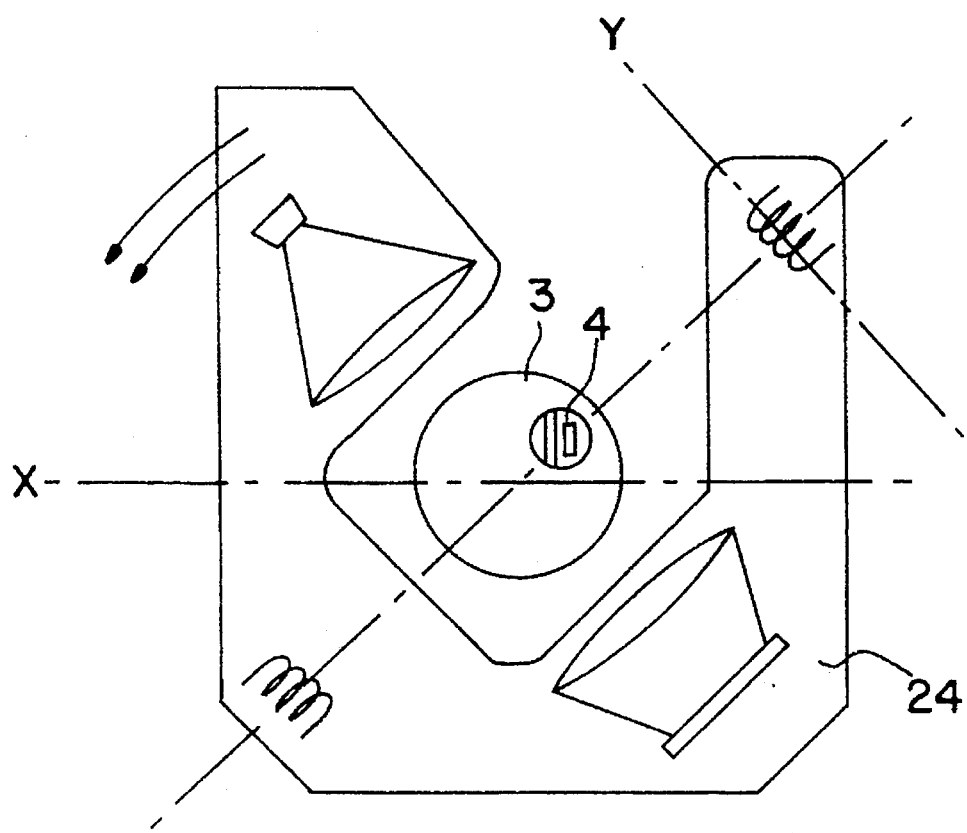
FIG. 6 depicts a housing for the opto-inductive means of the measuring system.
Figure 7:
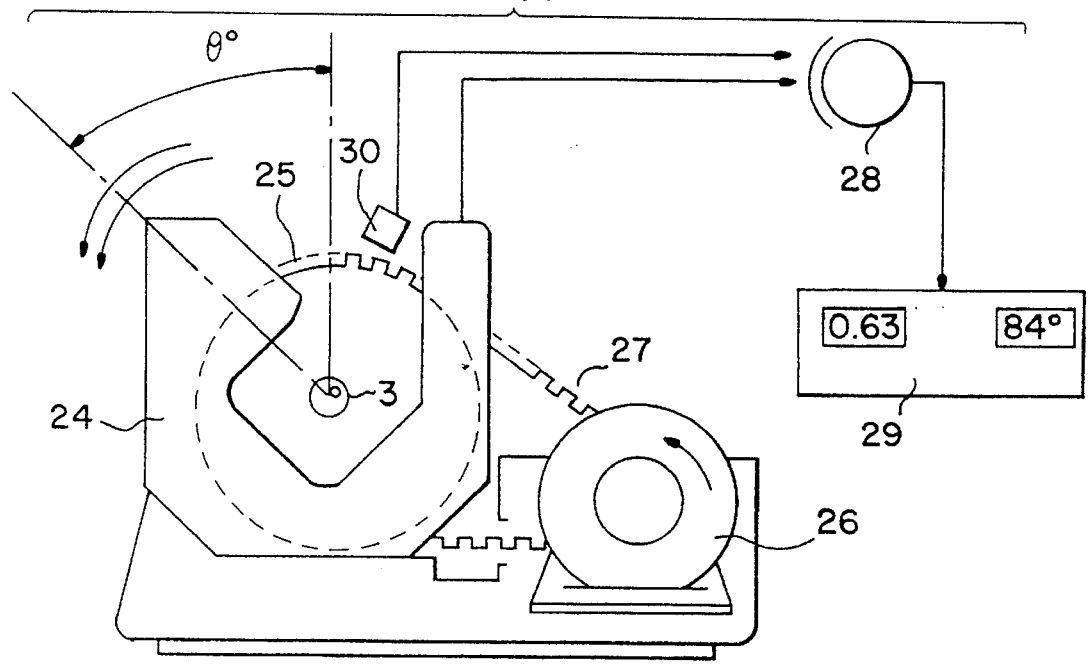
FIG. 7 depicts a schematic view of the measuring system incorporating the housing of FIG. 6.

Alternatively, as depicted in FIGS. 6 and 7, both the aforementioned inductive and optical systems may be placed in an enclosure 24 which may then be rotated around the cable 3 in order to effect an all around measure of the eccentricity of the cable product.

The enclosure 24 as shown in FIG. 6 is, in a practical arrangement, integral with a rotary component 25 as shown in FIG. 7, which is driven by means of an electric motor 26 and an interconnecting driving belt 27. The enclosure or housing 24 is thereby rotated around the cable 3 at right angles to its direction of movement.

The output from the optical and inductive components may then be transferred through a set of slip rings or otherwise a non-contact rotary transformer 28 to a processing unit 29 which will condition and calculate the eccentricity of the product as desired.

A transducer 30 is installed on the rotary component which will provide an output corresponding to the position of the housing 24. This output may then be transferred through the set of slip rings or rotary transformer 28 to the processing unit 29 and thereby at all times the eccentricity as well as the angular position of the housing 24 corresponding to that eccentricity may be calculated and displayed on the processing unit 29.

A further embodiment of an eccentricity gauge according to the invention is as depicted in FIGS. 8–13.

Figure 8:
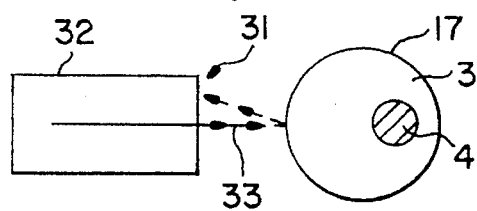
FIG. 8 depicts a laser optical device in relation to the cable according to a measuring system in accordance with a second embodiment of the invention.

Referring to FIG. 8, a section of cable product 3 as before is shown having an eccentric metallic conductor core 4 within the plastic or insulating coating of the cable. In this embodiment the method for measuring the distance from the edge 31 of an optical unit 32 to the surface of the plastic coating 17 functions by means of a laser beam 33 emitted from the front face of the unit 32 directed towards a portion of surface of the product 17 wherefrom the beam is reflected towards the face of the unit 32.

Figure 9:
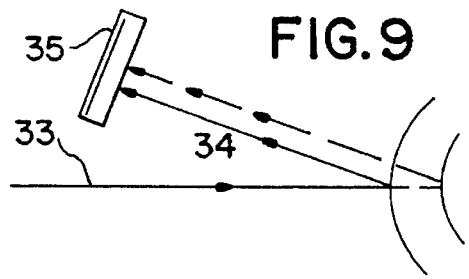
FIG. 9 depicts an optical detector matched with the laser optical system of FIG. 8.

As is clearly shown in FIG. 9, the reflected laser beam 34 then falls upon, for example, a CCD 35 at a nominal position. If the surface of the cable then moves to a different position, the reflected beam 34 will move accordingly to a different position upon the CCD 35 and, thereby, a measure may be obtained of the positional change of the surface of the cable 17.

Figure 10:
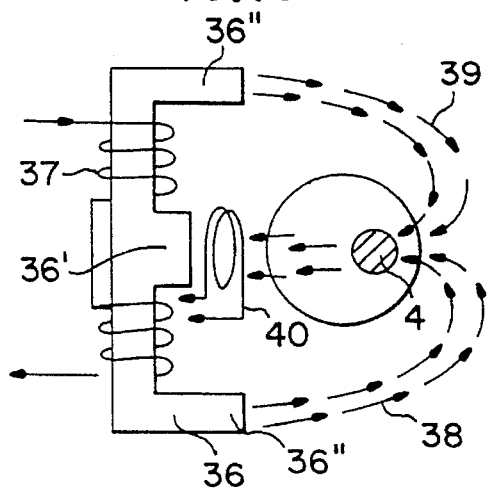
FIG. 10 shows the inductive means of the second measuring system.

The inductive system as employed in the second embodiment is as shown in FIG. 10, whereby the magnetic field utilised in the measurement of the distance of the conductor core 4 from the inductive system is generated by means of an E-core 36 with a coil 37 wound on the core 36 to either side of the central limb 36' in such a way that when a current flows in the coil 37 a magnetic field 38, 39 will appear from the two external limbs 36" of the E-core 36 flowing past the cable conductor core 4 and entering the central portion 36' of the E-core 36 as shown.

Located just in front of the central limb 36' is a small search coil 40 which will monitor the magnetic flux flowing through itself linking back to the central limb 36'. This magnetic flux will be sensitively dependent on the distance and position of the cable core 4 within the magnetic field 38, 39 and thus the electrical output generated in the search coil 40 will be a proportional measure of the position of the cable core 4 within the magnetic field 38, 39 and hence of the distance of the cable core 4 from the search coil 40.

The known positions of, for example, the optical unit 32 and the search coil 40 will then allow a relative datum plane 41 to be defined.

Therefore, again an opto-inductive method of measurement is provided, on the one hand measuring the distance of the surface 17 of the product from the datum 41 by optical means, and on the other hand., measuring the distance of the metallic conductor core from that same datum 41 by magnetic inductive means.

Figure 11:
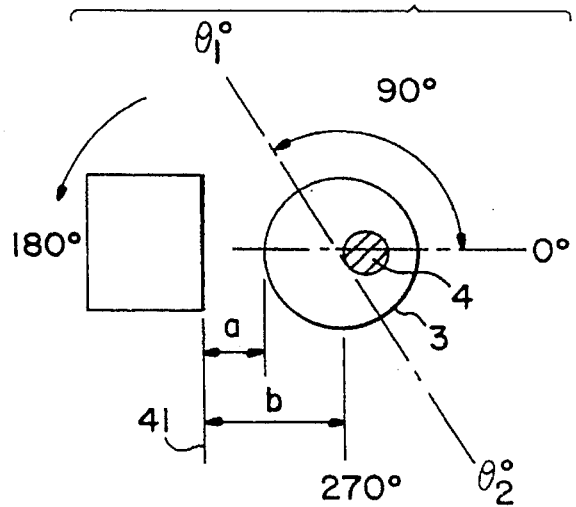
FIG. 11 shows the datum point in reference to the cable.

FIG. 11 shows this fixed datum 41 from which (a) is the distance of the cable surface and (b) is the distance of the conductor core.

Figure 12:
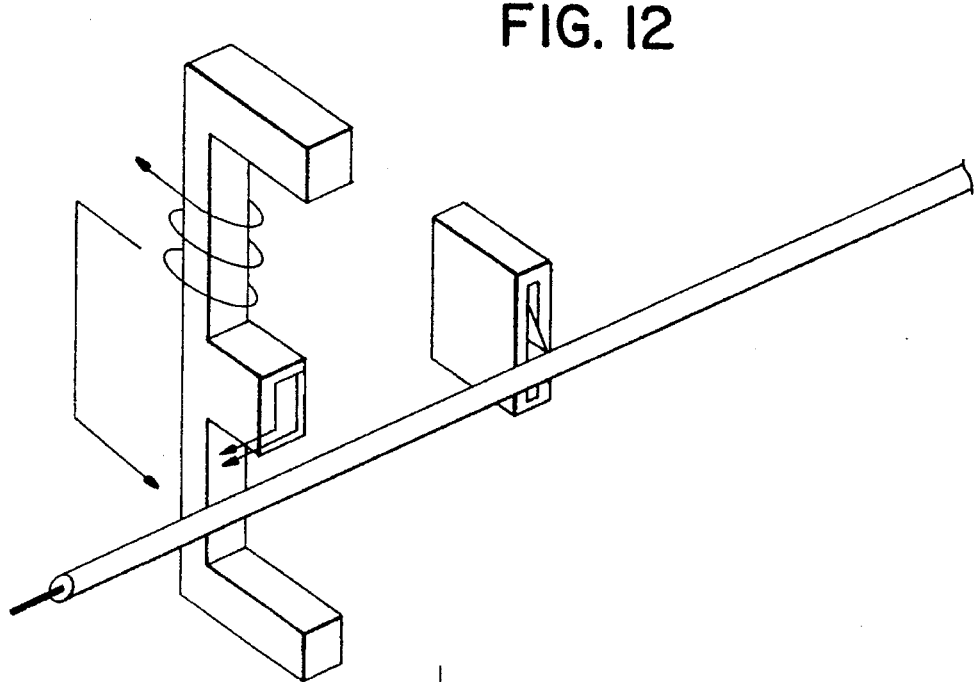
FIG. 12 depicts an arrangement of the optical and inductive means of the second measuring system.

FIG. 12 shows a construction according to this method and apparatus having opto-inductive components positioned in space such that the required measurement may be effected.

Figure 13:
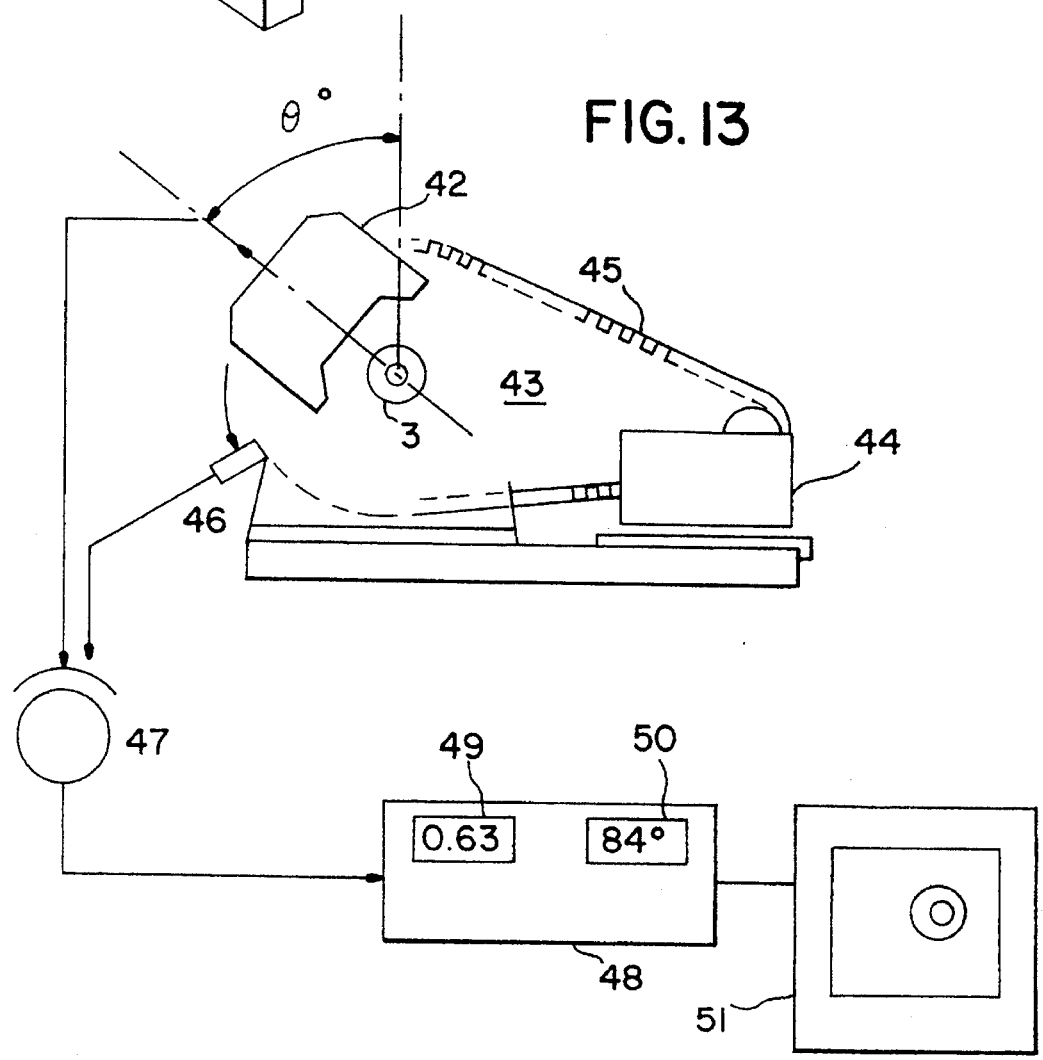
FIG. 13 illustrates a schematic depiction of the measuring system according to this second embodiment.

FIG. 13 shows a housing 42 containing the opto-inductive components, which housing 42 may be mounted on a rotating device 43, rotatable in a plane at right angles to the direction of extension of the cable product 3.

An electric motor 44 may then drive the housing 42 using a time belt or the like 45 in a complete circle around the product 3. A transducer 46 is installed such that the position of the housing 42 is known at all times.

Both outputs from the opto-inductive components as well as the output from the transducer 46 are then transferred through slip-rings or otherwise rotary non-contact transformers 47 into a conditioning and processing unit 48 which will display the eccentricity 49 as well as the angular position 50 of the housing 42 corresponding to that eccentricity on displays.

Furthermore, of course, the output of this processing unit 48 may be fed to a visual display unit 51 which may then display a picture corresponding to the actual cable product 3 in sectional form.

The invention as described above with reference to the preferred embodiments may be seen in summary to comprise a method and apparatus for measuring and displaying the eccentricity of a metallic conductor within an insulating coating during an extrusion process. The apparatus and method utilise optical means for detecting the position of the outer surface of the travelling cable and inductive means for detecting the position of the conductor cable and, by solving mathematical equations, the mount of eccentricity of the conductor within the plastics or insulating coating may be derived.

The scanning optical technique determines the position of the outer surface of the cable within the optical limits of the apparatus and the inductive technique determining the position of the conducting core within the inductive limits of the apparatus, by which the position of the electrical conductor within the optical field is determined.

By incorporating a feed back loop, it is possible to control the extrusion process by adjusting the die head through which the cable coating is extruded onto the conductor core 4 and thus correct for the eccentricity of the core within the cable 3.

The optical means which determine the position of the outer surface of the cable and the inductive means which determine the inner conductor of the cable may operate in two planes at right angles to each other.

An out of balance signal may be obtained in these two planes for feed back purposes to control cable eccentricity.

I claim:

1. Apparatus for determining the position of the conductor core of an electrical cable being formed in an extrusion process comprising optical means for transmitting a beam of light across the cable, detector means for receiving the beam reflected from the cable and providing output signals representative of the position of the outer surface of the cable in relation to the optical means, electrical inductive means comprising an E-shaped core, with outer limbs and a central limb attached to a common yoke, wound with a current carrying induction coil for inducing magnetic fields in the vicinity of the cable, means for detecting variation in the field strength of said magnetic fields as a result of movement of the conductor core through said fields corresponding to a change in position of the conductor core from a desired-location within the cable thereby to provide a measure of the position of the conductor core in relation to the inductive means, and means for relating the position of said conductor core to the position of the outer surface of the cable whereby to determine the eccentricity or off-set position of the conductor core with respect to said desired location within the cable, wherein said cable is placed at an outer tip of said central limb, whereby lines of force of said induced magnetic fields are set up respectively between the outer limbs and the central limb of the E-shaped core to provide a convergent magnetic flux through said cable from both of said outer limbs leading to the central limb, said detecting means being a search coil placed between an outer tip of the central limb of the E-shaped core and the cable so that the convergent magnetic flux engendered by said induced magnetic fields threads the search coil.

2. Apparatus as claimed in claim 1 wherein said induction coil is wound about said yoke on opposite sides of said central limb, with an axis normal to the axis of the induction coil lying on an axis of the optical scanning beam.

3. Apparatus as claimed in claim 2 wherein there are at least two inductive means located on opposite sides of the cable and wherein said means for detecting variation in the field strength is adapted to register null detection when the conductor core is at said desired location within the conductor cable.

4. Apparatus as claimed in claim 1 wherein said optical means, said detector means, said electrical inductive means and said means for detecting variation in field strength are mounted in a housing for rotation around the cable, and wherein a transducer is arranged to provide a measure of rotatable positions of the housing around the cable to thereby provide an all round determination of the eccentricity of the conductor core with respect to said desired location within the cable.

5. A method for determining the position of a conductor of an electrical cable being formed in an extrusion process comprising transmitting a beam of light towards the cable, providing output signals representative of the position of the outer surface of the cable and corresponding to the reflection of the beam from the cable, providing induced magnetic fields in the vicinity of the cable, determining the variation in said magnetic fields brought about by a change in position of the conductor core moving from a desired location within the cable through the induced magnetic fields to provide a measure of the position of the conductor core, and determining the position of the conductor core with respect to the desired location by relating the position of the outer surface of the cable to the position of the conductor core;

wherein the step of providing induced magnetic fields in the vicinity of the cable is carried out by placing an E-shaped core, having outer limbs and a central limb attached to a common yoke, wound with a current carrying induction coil, adjacent the cable, with an outer tip of the central limb being directed toward the cable, and wherein the step of determining the variation in said magnetic fields is carried out by placing a search coil adjacent the central limb, between the outer tip of the central limb and the cable, for having a current induced therein indicative of the position of the conductor core.

6. A method as claimed in claim 5, wherein the current passed through the inductive means is such that the induced magnetic fields are in opposition to one another.

7. Apparatus for determining the position of the conductor core of an electrical cable being formed in an extrusion process comprising optical means for transmitting a beam of light towards the cable, detector means for receiving that portion of the beam not obscured by the cable and providing output signals representative of the position of the outer surface of the cable in relation to the optical means, electrical inductive means comprising an E-shaped core, with outer limbs and a central limb attached to a common yoke, wound with a current carrying induction coil for inducing magnetic fields in the vicinity of the cable, means for detecting variation in the field strength of said magnetic fields as a result of movement of the conductor core through said fields corresponding to a change in position of the conductor core from a desired location within the cable thereby to provide a measure of the position of the conductor core in relation to the inductive means, and means for relating the position of said conductor core to the position of the outer surface of the cable whereby to determine the eccentricity or off-set position of the conductor core with respect to said desired location within the cable, wherein said cable is placed at an outer tip of said central limb, whereby lines of force of said induced magnetic fields are set up respectively between the outer limbs and the central limb of the E-shaped core to provide a convergent magnetic flux through said cable from both of said outer limbs leading to the central limb, said detecting means being a search coil placed between an outer tip of the central limb of the E-shaped core and the cable so that the convergent magnetic flux engendered by said induced magnetic fields threads the search coil.

8. Apparatus as claimed in claim 7 wherein said induction coil is wound about said yoke on opposite sides of said central limb, with an axis normal to the axis of the induction coil lying on an axis of the optical scanning beam.

9. Apparatus as claimed in claim 8 wherein there are at least two inductive means located on opposite sides of the cable and wherein said means for detecting variation in the field strength is adapted to register null detection when the conductor core is at said desired location within the conductor cable.

10. Apparatus as claimed in claim 7 wherein said optical means, said detector means, said electrical inductive means and said means for detecting variation in field strength are mounted in a housing for rotation around the cable, and wherein a transducer is arranged to provide a measure of rotatable positions of the housing around the cable to thereby provide an all round determination of the eccentricity of the conductor core with respect to said desired location within the cable.

11. A method for determining the position of the conductor of an electrical cable being formed in an extrusion process comprising transmitting a beam of light towards the cable, providing output signals representative of the position of the outer surface of the cable and corresponding to that position of the transmitted beam not obscured by the cable, providing induced magnetic fields in the vicinity of the cable, determining the variation in said magnetic fields brought about by a change in position of the conductor core moving from a desired location within the cable through the induced magnetic fields to provide a measure of the position of the conductor core, and determining the position of the conductor core with respect to the desired location by relating the position of the outer surface of the cable to the position of the conductor core;

wherein the step of providing induced magnetic in the vicinity of the cable is carried out by placing an E-shaped core, having outer limbs and a central limb attached to a common yoke, wound with a current carrying induction coil, adjacent the cable, with an outer tip of the central limb being directed toward the cable, and wherein the step of determining the variation in said magnetic fields is carried out by placing a search coil adjacent the central limb, between the outer tip of the central limb and the cable, for having a current induced therein indicative of the position of the conductor core.

12. A method as in claim 11 wherein the current passed through the inductive means is such that the induced magnetic fields are in opposition to one another.

* * * * *